(12) United States Patent
Pires et al.

(10) Patent No.: US 9,775,423 B2
(45) Date of Patent: Oct. 3, 2017

(54) COSMETIC CONTAINER (71) Applicant: Zen Design Solutions Limited, Kowloon (HK)

(72) Inventors: Leo Clifford Pires, Basking Ridge, NJ (US); Roger Hwang, Maple (CA); Rahul Bose, New Delhi (IN)

(73) Assignee: ZEN DESIGN SOLUTIONS LIMITED, Kowloon, Hong Kong (CN)

( * ) Notice: Subject to any disclaimer, the term of this patent is extended or adjusted under 35 U.S.C. 154(b) by 0 days.

(21) Appl. No.: 15/069,433

(22) Filed: Mar. 14, 2016

(65) Prior Publication Data

US 2016/0192762 A1 Jul. 7, 2016

Related U.S. Application Data

(63) Continuation of application No. 14/334,823, filed on Jul. 18, 2014, now Pat. No. 9,314,086.

(30) Foreign Application Priority Data

Aug. 2, 2013 (IN) .......................... 2323/DEL/2013

(51) Int. Cl.
| *A45D 40/20* | (2006.01) |
| *A45D 40/12* | (2006.01) |
| *A45D 40/00* | (2006.01) |
| *B29C 39/10* | (2006.01) |
| *B29C 39/24* | (2006.01) |
| *B29C 39/36* | (2006.01) |
| *B29C 39/38* | (2006.01) |
| *B29K 105/00* | (2006.01) |
| *B29K 55/02* | (2006.01) |
| *B29L 31/00* | (2006.01) |

(52) U.S. Cl.
CPC ............. *A45D 40/12* (2013.01); *A45D 40/00* (2013.01); *B29C 39/10* (2013.01); *B29C 39/24* (2013.01); *B29C 39/36* (2013.01); *B29C 39/38* (2013.01); *A45D 2040/0018* (2013.01); *B29K 2055/02* (2013.01); *B29K 2105/0058* (2013.01); *B29L 2031/712* (2013.01); *B29L 2031/718* (2013.01)

(58) Field of Classification Search
CPC ................ A45D 40/00; A45D 40/0018; A45D 40/0068; A45D 40/22; A45D 2040/222; A45D 2040/225; A45D 2040/226; A45D 2040/227; A45D 2040/228
USPC .......................................................... 401/88
See application file for complete search history.

(56) References Cited

U.S. PATENT DOCUMENTS

| 1,852,455 | A | 4/1932 | Friedman |
| 4,235,557 | A | 11/1980 | Hayes |
| 4,728,210 | A | 3/1988 | Barish et al. |
| 7,699,062 | B2 | 4/2010 | Sasaki |
| 8,888,391 | B2 | 11/2014 | Teller et al. |
| 2015/0210439 | A1 | 7/2015 | Kim |

*Primary Examiner* — Jennifer C Chiang
(74) *Attorney, Agent, or Firm* — Patterson + Sheridan, LLP (57) ABSTRACT

A container for packaging and dispensing of a solid cosmetic or care product. The container comprises a hollow base and a cap for holding the solid product. The cap is rotatably mounted on the hollow base of the container to present the solid product to a surface of application including skin, face, lip, eyelashes, hair, nail etc.

19 Claims, 6 Drawing Sheets

COSMETIC CONTAINER

CROSS-REFERENCE TO RELATED APPLICATION

This patent application is a continuation of and claims the benefit of priority to U.S. patent application Ser. No. 14/334,823 filed Jul. 18, 2014, which in turn claims the benefit of priority to Indian Provisional Application Ser. No. 2323/DEL/2013, filed Aug. 2, 2013. The disclosure of each of the aforementioned patent applications is incorporated by reference herein in its entirety for any purpose whatsoever.

BACKGROUND

Field of the Invention

Embodiments of the present disclosure generally relate to a container for packaging and dispensing of a solid cosmetic or care product. The container comprises a hollow base and a cap for holding the solid product. The cap is rotatably mounted on the hollow base of the container to present the solid product to a surface of application including skin, face, lip, eyelashes, hair, nail etc.

Description of the Related Art

Present day cosmetic containers for packaging and dispensing solid cosmetic or care products such as solid antiperspirants, lipstick, lip balm, blush, cake mascara are receiving wide acceptance in the marketplace.

Contemporary solid product containers generally require that a user push or screw the product upward out of a base or a receptacle to expose it for application. While these types of containers are functional, they are expensive in that they require either intricate multiple parts or expensive assembling techniques and machinery. Generally, these cosmetic containers utilize a product in cylindrical stick form and have relatively sharp edges which edges cause discomfort to the user when the stick is originally applied to the skin.

Cosmetic stick form of product has been made in the past that do not require an advancing means for the product within the container. An example of such a container is described in U.S. Pat. No. 4,728,210 issued to Barrish et al. on Mar. 1, 1988. This reference discloses a solid personal care product packaged in a container having a cover and handle, with the personal care product being attached to a gripping plate on the cover for removal from the container with the cover. The gripping plate preferably includes a porous member which is impregnated with a portion of the solid product to firmly grip the solid product for removal with the cover. Therefore, this package requires no advancing means.

U.S. Pat. No. 4,235,557 issued to Hayes on Nov. 25, 1980 discloses a device having a product holding structure with a removable cover. Both the product holding structure and the cover have a cavity into which a hot-fill product may be introduced. Also attached to the product holding structure is a handle. In use, the cover is removed from the product holding structure to expose the product so that it may be applied.

Since, the above mentioned containers for packaging and dispensing solid products have covers/caps which need to be removed from the container before using the product, there are increased chances of losing the cover. If the cover is lost, the above containers cannot be used for a longer time as the product will get deteriorated due to contact with air.

It is an object of this disclosure to provide a container for packaging and dispensing a solid product wherein the container does not require the user to screw or push up the product to expose it from its housing/reservoir.

It is a further object of this disclosure to provide a container for packaging and dispensing a solid product wherein the container provides a product shape which is comfortable to use even upon initial application.

It is a further object of this disclosure to provide a container for packaging and dispensing a solid product, wherein the container does not have a removable cap thereby reducing chances of losing the cap.

SUMMARY

The present disclosure generally relates to a container comprising a solid product used for cosmetic and care applications on skin/face or on keratinous fibers, lash care, nail care, mascara application or removal, lip application, hair coloring, hair repair, wound care etc.

The term "solid product" as used herein includes a solid or semi-solid product, compressed powder product and the like which can be used for cosmetic, care or medicinal applications.

According to an embodiment of the disclosure, there is provided a container comprising a hollow base and a cap containing a solid product wherein the cap is rotatably mounted on the hollow base of the container.

According to an embodiment of the disclosure, there is provided a container comprising a hollow base and a cap configured to rotate inside the hollow base, wherein the cap comprises a support member which secures a solid product to the cap. The cap can be rotated in one direction to bring the container to a closed position in which the solid product faces towards a bottom end of the hollow base and the cap can be rotated in opposite direction to bring the container to an open position in which the solid product faces away from the hollow base and can be applied by holding the hollow base.

According to another embodiment of the disclosure, there is provided a container comprising a hollow base elongated along a central longitudinal axis. The hollow base comprises at least one side wall, an open top end and a bottom end. The bottom end may be open or closed. A cap containing a solid product is mounted near the top end of the hollow base wherein the cap is configured to rotate inside the hollow base along an axis perpendicular to the central longitudinal axis of the hollow base. Further, the cap can be turned through 180 degree in one direction to expose the solid product from the top end of the hollow base to bring the container to an open position and through 180 degree in reverse direction to enclose the solid product within the hollow base to bring the container to a closed position. It would not be beyond the scope of the present disclosure that the cap can be turned through less than or greater than 180 degree in one direction to expose the solid product from the top end of the hollow base to bring the container to an open position and can be turned through less than or greater than 180 degree in reverse direction to enclose the solid product within the hollow base to bring the container to a closed position. Such an arrangement of the cap with the hollow base of the container avoids the need of removing the cap from the container to expose the product. The hollow base has a sufficient depth to allow the cap to turn to expose the product. This in turn reduces the chances of missing the cap as the cap is not completely removed from the container.

According to another embodiment of the disclosure, there is provided a container comprising a hollow base comprising a side wall, an open top end and a bottom end. The bottom end may be open or closed. Further, the container comprises a cap comprising a closed end, an open end and a rim at the open end. The cap is provided with a diametrically opposed pair of rotation means in form of lugs, pins, or protrusions on an outer surface of the rim of the cap wherein the pair of rotation means is configured to be disposed or mounted within a corresponding pair of apertures or holes present on an inner surface of the side wall near the top end of the hollow base to allow the cap to rotate or turn within the hollow base.

According to an alternate embodiment of the disclosure, there is provided a container comprising a hollow base comprising a side wall, an open top end and a bottom end; and a cap comprising a closed end, an open end and a rim at the open end. The bottom end of the hollow base may be open or closed. The cap is further provided with at least one guiding means in form of a lug, a pin, or a protrusion on an outer surface of the rim of the cap wherein the at least one guiding means is configured to travel in a corresponding groove provided on an inner surface of the side wall near the top end of the hollow base. Preferably, the cap is provided with a diametrically opposed pair of guiding means in form of lugs, pins, or protrusions on the outer surface of the rim of the cap wherein the diametrically opposed pair of guiding means is configured to travel in a corresponding pair of grooves provided on the inner surface of the side wall near the top end of the hollow base. The grooves can be of any shape but preferably semicircular. The guiding means of the cap travel in the corresponding grooves of the hollow base thereby guiding the rotation of the cap within the hollow base. Preferably, the guiding means travel in the corresponding semicircular shaped grooves in the side wall of the hollow base to allow the cap to rotate through 180 degree in one direction to open the container and through 180 degree in opposite direction to close the container. The guiding means further help to prevent extraction/removal of the cap from the hollow base, in a case where the container falls out of user's hand or during transport of the cosmetic container from one place to another.

According to another embodiment of the disclosure, there is provided a container comprising a hollow base comprising a side wall, an open top end and a bottom end, and a cap comprising a closed end, an open end and a rim at the open end. The cap is provided with at least one locking means in form of a groove or a protrusion on an outer surface of the rim of the cap which engages with a corresponding protrusion or a groove provided on an inner surface of the side wall near the top end of the hollow base. Preferably, the cap is provided with at least one diametrically opposed pair of locking means in form of grooves or protrusions on the outer surface of the rim of the cap which engages with a corresponding pair of protrusions or grooves provided on the inner surface of the side wall near the top end of the hollow base. The locking means is provided to prevent the accidental movement of the cap from a closed position to an open position or vice versa.

According to another embodiment of the disclosure, there is provided a container comprising a hollow base and a cap, wherein the cap comprises a support member carrying a solid product at an open end of the cap. The solid product in the support member may include a solid molded product in form of a block or cake which can be directly applied to an application surface by holding the hollow base of the container or with the aid of a finger, a brush or a puff. The product can be molded in a variety of shapes including a flat shape, square, rhombus, circular, dome and the like. Preferably, the product is molded in a dome shaped product. The product may also be a pressed powder product. The application surface includes skin including face, lip; or keratinous fibers including lashes, nail and hair etc.

According to another embodiment of the disclosure, there is provided a container comprising a hollow base and a cap, wherein the cap comprises a support member carrying a solid product at an open end of the cap. The support member carrying the solid product can be attached to the open end of the cap by various attachment means like screw thread, snap fit and the like. The support member further comprises an outer skirt and an inner skirt, wherein the outer skirt comprises threads or at least one projection on its outer surface which engages with corresponding threads or a groove present on an inner surface near the open end of the cap. The outer skirt may also comprise at least one cut out for providing flexibility to the outer skirt so that the support member can be easily fitted into the cap.

According to another embodiment of the disclosure, there is provided a container comprising a hollow base and a cap comprising a support member carrying a solid product at an open end of the cap wherein the cap is rotatably mounted near a top end of the hollow base. The support member further comprises an outer skirt and an inner skirt. The support member further comprises a support surface comprising a plurality of apertures. The plurality of apertures may be of any shape selected from circular, oval, rectangular, square, and polygonal. The support surface may be in form of plurality of ribs separating the plurality of apertures for gripping/holding the solid product. In various embodiments of the disclosure, the support surface may be a flat surface or a raised surface wherein the raised surface can be a domed surface or a surface of any other shape. Further, the support surface may be a smooth surface or have surface irregularities.

According to an embodiment, the plurality of ribs is arranged radially or laterally or in any other suitable manner such that the plurality of apertures is defined between adjacent ribs. For example, the ribs may be arranged in a form of grid wherein each of the plurality of ribs may have two opposing ends attached to an inner surface of the inner skirt. Alternatively, the ribs may originate from a central portion of the support surface and radiate outwardly towards the inner surface of the inner skirt. The support member also comprises a gripping post integrally connected to the support surface and projecting above the level of inner skirt. The gripping post is provided to pull the support member out from a mold used for making solid product. Optionally, the support member may further include a plurality of protrusions extending downwardly from a bottom surface of ribs towards the hollow base to provide additional support to the solid product.

The solid product can be attached to the support member according to the methods known in the art. According to an embodiment of the disclosure the solid product is attached on the support member by following steps:
1. Placing the support member on an open end of a mold.
2. Filling the mold by pouring a liquid product in the mold through the apertures/spaces in the support surface.
3. Cooling the filled molds by passing them through a cooling chamber.
4. After passing through the cooling chamber, the product solidifies and contracts and the support member can be pulled out of the mold. In one example, the support member can be pulled out by using the gripping post of the support member.

The shape of the mold can vary depending upon the required shape of the solid product which may include flat shape, square, rhombus, circular, dome and the like.

Further, according to another embodiment, the product in the mold can be further compressed by applying pressure with a pressing disk having a shape complementary to the support surface of the support member.

These and further aspects which will be apparent to the expert of the art are attained by a cosmetic container in accordance with the drawings of the present disclosure.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is to be noted, however, that the appended drawings illustrate only typical embodiments of this disclosure and are therefore not to be considered limiting of its scope, for the disclosure may admit to other equally effective embodiments.

DETAILED DESCRIPTION

A container 100 according to one embodiment of the present disclosure is shown in FIG. 1 to FIG. 6.

Figure 1:
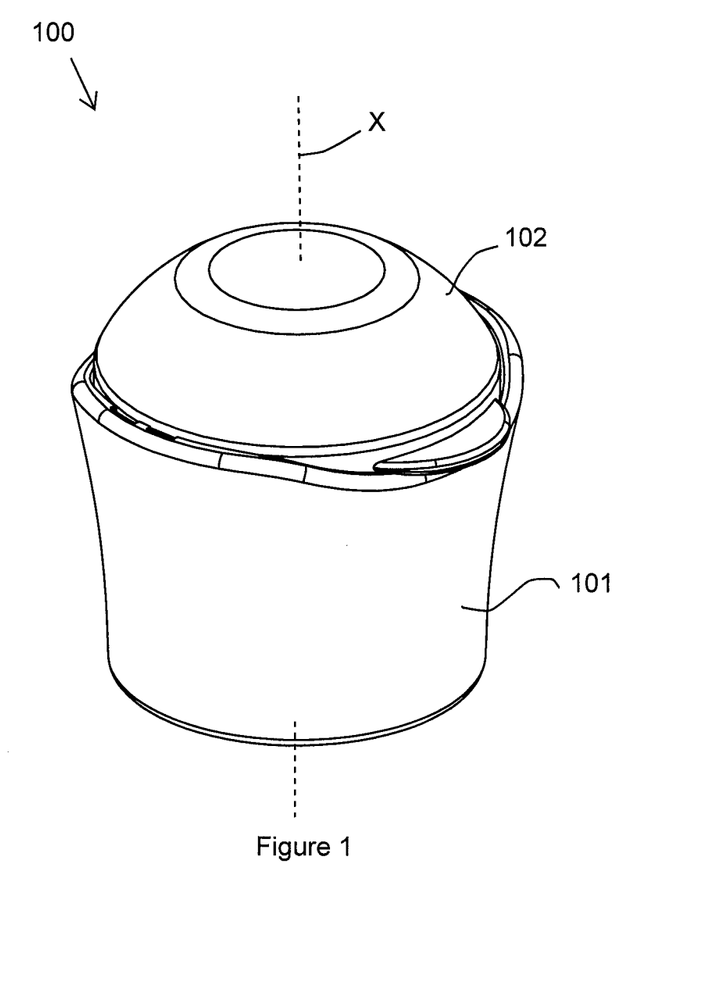
FIG. 1 illustrates a perspective view of a container in a closed position according to an embodiment of the present disclosure.
Figure 2:
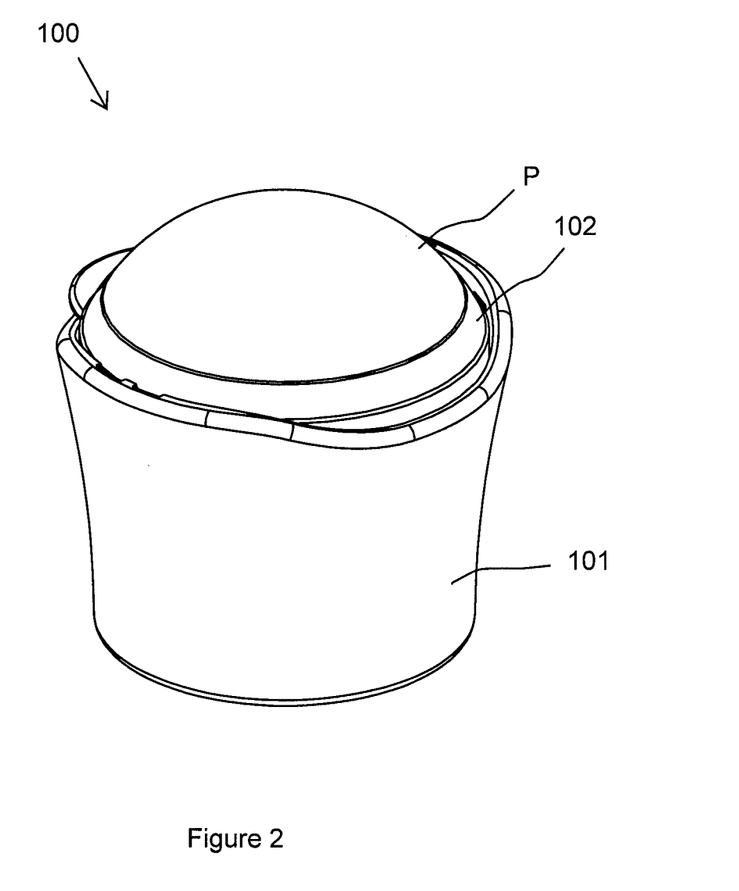
FIG. 2 illustrates a perspective view of a container of FIG. 1 in an open position.

FIG. 1 and FIG. 2 illustrate a perspective view of a container 100 in its closed position and open position, respectively, with respect to one embodiment of the present disclosure. As embodied herein and as shown in FIG. 1 and FIG. 2, the container 100 comprises a hollow base 101 and a cap 102. The hollow base 101 is elongated along a central longitudinal axis X. The cap 102 holds a solid product P.

In a preferred embodiment, the container 100 is formed from the Acrylonitrile butadiene styrene (ABS) material. In an alternate embodiment, the container 100 can be formed from any other suitable polymeric material or any other option available.

In a preferred embodiment, the container 100 is of substantially cylindrical shape. In an alternate embodiment, the container 100 can be made of any shape such as square, circular, oval, spherical or oyster shape etc.

Figure 3:
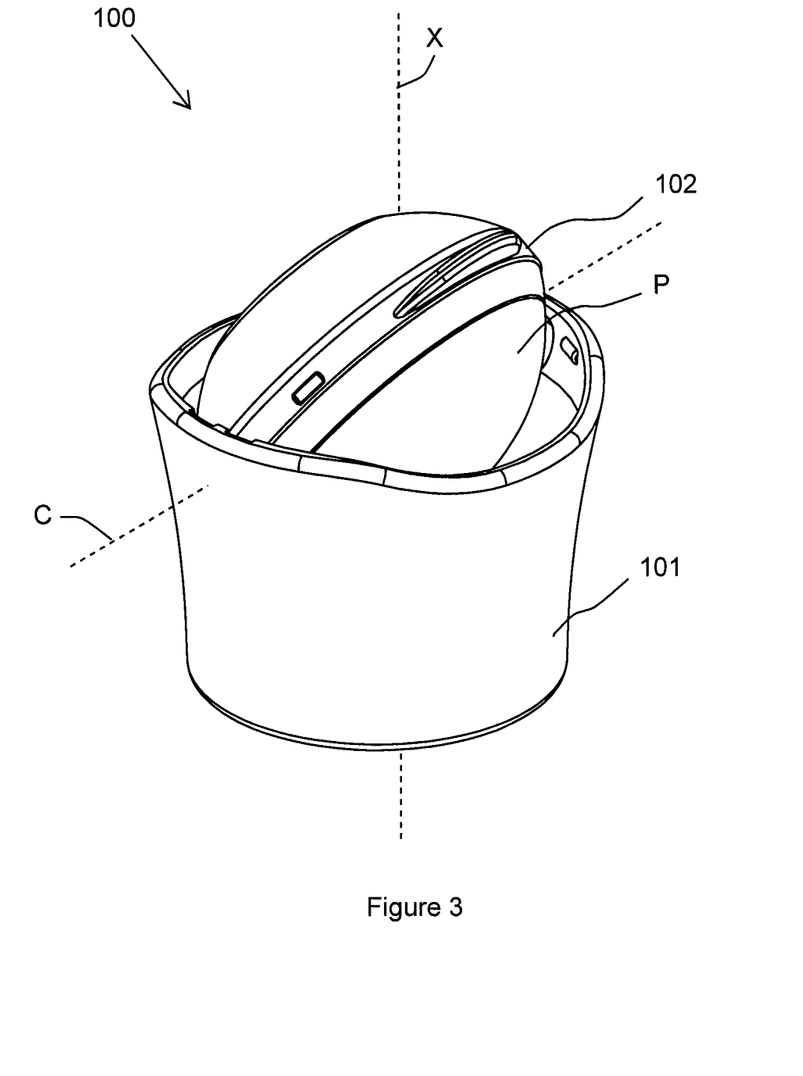
FIG. 3 illustrates a perspective view of a container of FIG. 1 showing rotation of a cap within a hollow base.

As shown in FIG. 3, the cap 102 holding the solid product P is configured to rotate inside the hollow base 101. The hollow base 101 is elongated along a central longitudinal axis X. The cap 102 is mounted on the hollow base 101 and is capable of rotating about an axis C substantially perpendicular to the central longitudinal axis X. The cap 102 can be rotated through 180 degree in one direction about the axis C to open the container 100 and through 180 degree in opposite direction about the axis C to close the container 100. It would not be beyond the scope of the present disclosure that the cap 102 can be turned through less than or greater than 180 degree in one direction to expose the solid product P from a top end of the hollow base 101 to bring the container 100 to an open position and can be turned through less than or greater than 180 degree in reverse direction to enclose the solid product P within the hollow base 101 to bring the container to a closed position.

As shown in FIG. 3 to FIG. 6, the container 100 includes a hollow base 101 and a cap 102. The cap 102 comprises a support member 104 which secures a solid product P to the cap 102.

Figure 4:
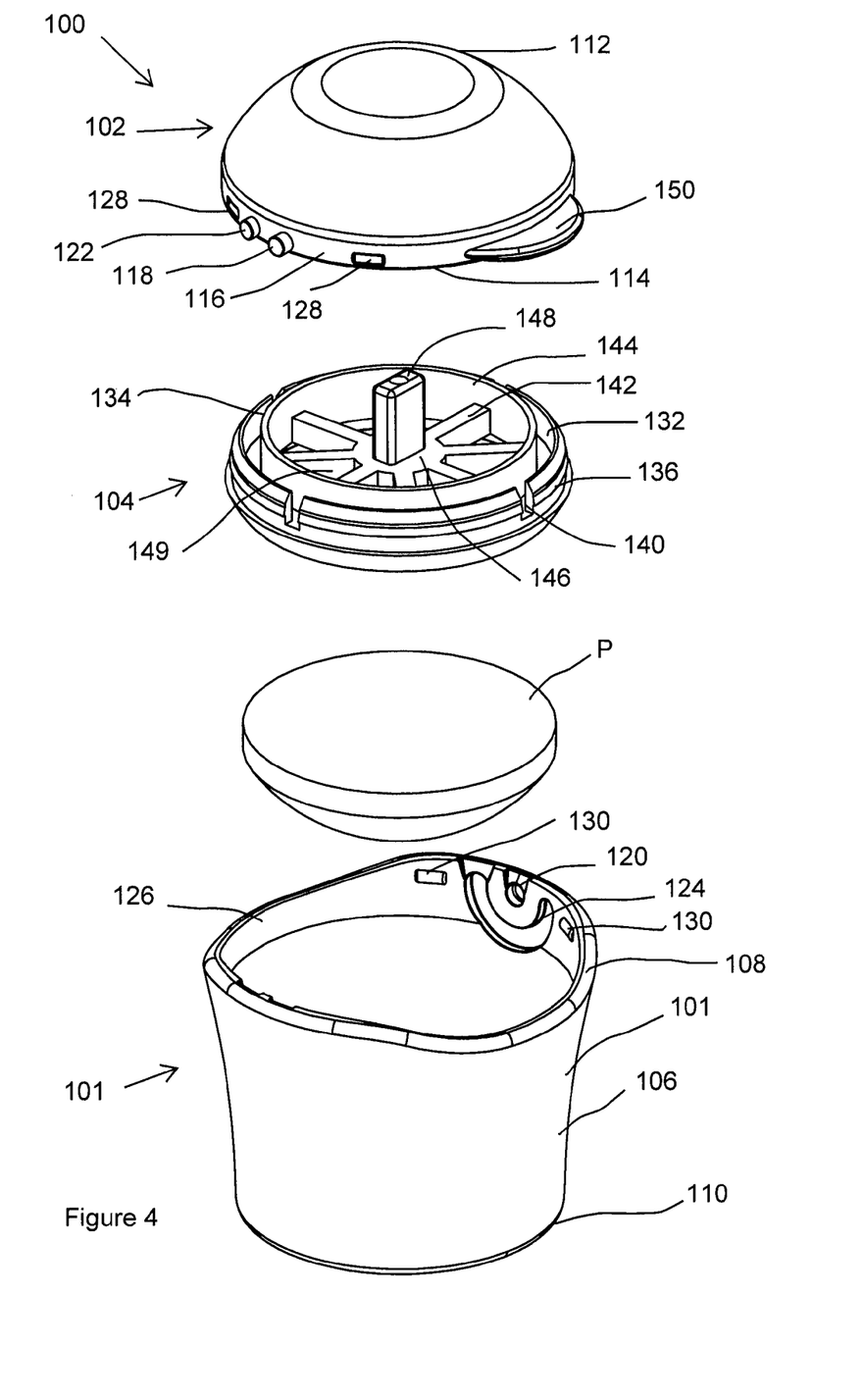
FIG. 4 illustrates an exploded view of a container of FIG. 1.
Figure 5:
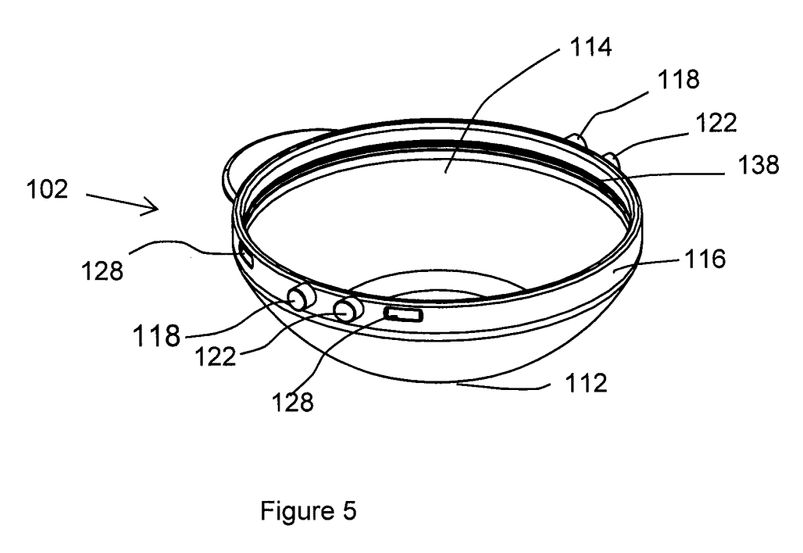
FIG. 5 illustrates a perspective view of a cap of a container of FIG. 1.

The hollow base 101 comprises a side wall 106, an open top end 108 and a bottom end 110. The bottom end 110 is closed. According to other embodiment, the bottom end 110 may be open and can also be used to store another product. The cap 102 comprises a closed end 112, an open end 114 and a rim 116 at the open end 114. The cap 102 is pivotally mounted on the side wall 106 near the top end 108 of the hollow base 101 so that the cap 102 can be rotated inside the hollow base 101. The cap 102 is provided with a diametrically opposed pair of rotation means on an outer surface of the rim 116 of the cap 102. In one embodiment and as shown in FIGS. 4 and 5, rotation means of the cap 102 includes a diametrically opposed pair of lugs/pins/protrusions 118 on an outer surface of the rim 116 which are configured to be disposed within a corresponding pair of apertures/holes 120 present in the side wall 106 near the top end 108 of the hollow base 101 to allow the cap 102 to rotate/turn within the hollow base 101. The cap 102 also comprises a lip 150 on the outer surface of the rim 116 which can be grasped by a user's hand to turn the cap 102 within the hollow base 101.

The cap 102 is further provided with at least one guiding means to guide the rotation of the cap 102 within the hollow base 101. In one embodiment and as shown in FIGS. 4 and 5, the guiding means of the cap 102 includes a pair of lugs/pins/protrusions 122 on the outer surface of the rim 116 of the cap 102 which are configured to travel in a pair of corresponding semicircular grooves 124 provided on an inner surface 126 of the side wall 106 near the top end 108 of the hollow base 101. The lugs/pins/protrusions 122 travel in corresponding semicircular grooves 124 in the side wall 106 of the hollow base 101 to allow the cap 102 to rotate through 180 degree in one direction to open the container 100 and through 180 degree in opposite direction to close the container 100. It would not be beyond the scope of the present disclosure that the grooves 124 can be of any shape that allows the cap 102 to rotate through more than 180 degrees or less than 180 degrees. The guiding means further help to prevent extraction/removal of the cap 102 from the hollow base 101, in a case where the container 100 falls out of user's hand or during transport of the cosmetic container 100 from one place to another.

The cap 102 is also provided with at least one locking means to prevent the accidental movement of the cap 102 from the closed position to the open position or vice versa. In one embodiment and as shown in FIGS. 4 and 5, the locking means of the cap 102 includes two diametrically opposed pairs of grooves 128 on an outer surface of the rim 116 of the cap 102 which engage with the corresponding pairs of protrusions 130 provided on an inner surface 126 near the top end 108 of the side wall 106 of the hollow base 101. It would not be beyond the scope of present disclosure that the locking means of the cap 102 include two diametrically opposed pairs of projections on an outer surface of the rim 116 of the cap 102 which engage with the corresponding pairs of grooves provided on an inner surface 126 near the top end 108 of the side wall 106 of the hollow base 101.

Figure 6:
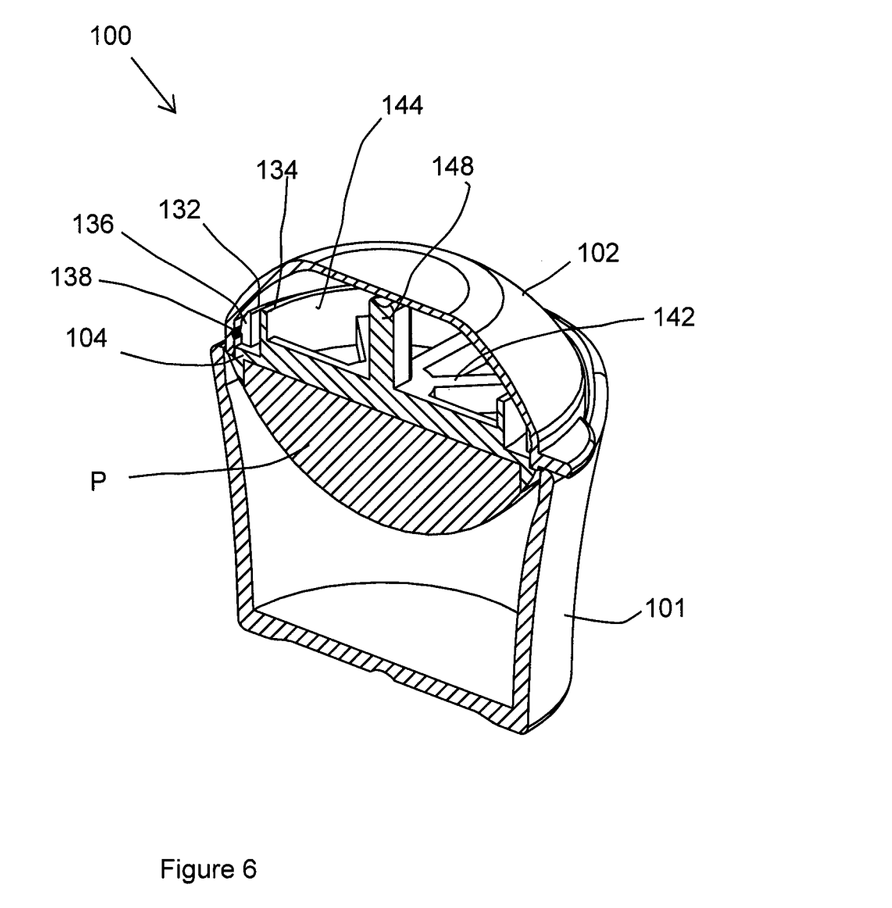
FIG. 6 illustrates a cross-sectional view of a container of FIG. 1.

The support member 104 is attached to the open end 114 of the cap 102. As shown in FIGS. 4-6, the support member 104 comprises an outer skirt 132 and an inner skirt 134, wherein the outer skirt 132 comprises a projection 136 on its outer surface which engages with corresponding annular groove 138 present on an inner surface of the open end 114 of the cap 102. The outer skirt 132 also comprises at least one cut out 140 for providing flexibility to the outer skirt 132 so that the support member 104 can be easily fitted into the cap 102. It would not be beyond the scope of present disclosure that the support member 104 can be attached to the open end 114 of the cap 102 by various attachment means like screw thread, snap fit and the like.

Further, the solid product P is attached to the support member 104 of the cap 102. As shown in FIGS. 4 and 6, the support member 104 comprises a support surface for gripping/holding the solid product P, the support surface comprises a plurality of apertures 149. The plurality of apertures 149 may be of any shape selected from circular, oval, rectangular, square, triangular, polygonal and the like. The support surface may be in form of plurality of ribs 142 separating the plurality of apertures 149 for gripping/holding the solid product P.

According to an embodiment, the plurality of ribs 142 is arranged radially or laterally or in any other suitable manner such that the plurality of apertures 149 is defined between adjacent ribs 142.

In various embodiments of the disclosure, the support surface may be a flat surface or a raised surface wherein the raised surface can be a domed surface or a surface of any other shape. Further, the support surface may be a smooth surface or have surface irregularities.

As shown in FIGS. 4 and 6, the support surface comprises a central portion 146 and a plurality of mutually spaced elongated ribs 142 radiating outwardly there from to an inner surface 144 of the inner skirt 134. The central portion 146 further comprises a gripping post 148 integrally connected to the central portion 146. The gripping post 148 projects above the level of inner skirt 134. The gripping post 148 is provided to pull the support member 104 out from a mold (not shown in the drawings) used for making the solid product P. It would not be beyond the scope of present disclosure that the gripping post 148 is provided on any other part of the support member 104. Also, it would not be beyond the scope of present disclosure that the plurality of ribs 142 may be arranged laterally or in any other suitable manner for gripping/holding the solid product P. As for example, the ribs 142 may be arranged in grid form wherein each of the plurality of ribs 142 may have two opposing ends attached to the inner surface 144 of the inner skirt 134.

According to another embodiment of the present disclosure, the support member 104 may include a plurality of protrusions (not shown) extending downwardly from a bottom surface of ribs 142 toward the hollow base 101 for providing additional support to solid product P.

The solid product P can be attached to the ribs 142 in the inner skirt 134 of the support member 104 according to the methods known in the art. According to a method employed in the present disclosure for attaching the solid product P to ribs 142, the support member 104 is first placed on a concave shaped mold or a mold of any other shape (not shown in the drawings) which is then filled by pouring a hot liquid product through the apertures/spaces 149 between the ribs 142. Then the mold filled with the hot liquid product is cooled by passing through a cooling chamber. As a result of cooling, the liquid product solidifies into a solid product P and gets attached to the ribs 142 of the support member 104. Now, the support member 104 carrying the solid product P can be pulled out of the mold by using the gripping post 148. The shape of the mold can vary depending upon the required shape of the solid product P like flat shape, square, rhombus, circular, dome and the like. Further, according to another embodiment, the product in the mold can be further compressed by applying pressure with a pressing disk having a shape complementary to the support surface of the support member.

During use, the user holds the hollow base 101 of the container 100 with a hand and opens the container 100 by turning the cap 102 in one direction around the transverse axis C by applying a force with a thumb on the lip 150 of the cap 102. As the force is applied on the lip 150, the cap 102 turns through 180 degree within the hollow base 101 to expose the solid product P. Now, the cap 102 rests in the open position as shown in FIG. 2 with the help of locking means, wherein the locking means are in the form of grooves 128 in the cap 102, which engage with the corresponding protrusions 130 on the inner surface 126 of the side wall 106 of the hollow base 101. The user applies the solid product P by holding the hollow base 101 and after using the solid product P, the user closes the container 100 by turning the cap 102 in opposite direction around the transverse axis C by applying a force with a thumb on the lip 150. As the force is applied on the lip 150, the cap 102 again turns through 180 degree in opposite direction within the hollow base 101 to enclose the solid product P within the hollow base 101. Now, the cap 102 rests in the closed position as shown in FIG. 1, with the help of locking means in the form of grooves 128 in the cap 102 which engage with the corresponding protrusions 130 on the inner periphery 126 of the side wall 106 of the hollow base 101.

The container 100 of the present disclosure may be used to deliver a wide variety of consumer and industrial products related to cosmetic, skin care, hair care, oral care, personal care, pharmaceutical, wound care, orally administrable products, home-care or adhesives.

Various examples of the products where the container 100 of the present disclosure could be used are but not limited to cheek blush, cheek plumping cake, lip plumping solid product, lip balm, temporary hair colors, hair care, skin care, foundation and the like.

While the foregoing is directed to embodiments of the present disclosure, other and further embodiments of the disclosure may be devised without departing from the basic scope thereof, and the scope thereof is determined by the claims that follow.

What is claimed is:

1. A container for packaging and dispensing of a solid cosmetic or care product, the container comprising:
   a hollow base;
   a cap mounted on the hollow base, the cap is rotatably mounted inside the hollow base;
   wherein the cap comprises a support member which secures a solid product to the cap, the support member comprises a support surface with a plurality of apertures;
   wherein when the cap is rotated in a first direction to bring the container to a closed position, the solid product is enclosed within the hollow base; and wherein when the cap is rotated in a second direction opposite to the first direction to bring the container to an open position, the solid product faces away from the hollow base.

2. The container according to claim 1, wherein the hollow base further comprises a side wall and an open top end; and wherein the cap comprises a closed end, an open end and a rim at the open end.

3. The container according to claim 2, wherein the cap is pivotally mounted on the side wall near the top end of the hollow base such that the cap can rotate inside the hollow base.

4. The container according to claim 3, wherein the cap is provided with a diametrically opposed pair of rotation means on an outer surface of the rim of the cap and wherein the diametrically opposed pair of rotation means is configured to be disposed within a corresponding pair of holes present in the side wall of the hollow base near the top end of the hollow base to allow the cap to rotate within the hollow base.

5. The container according to claim 4, wherein the diametrically opposed pair of rotation means is selected from one of a pair of lugs, pins and protrusions.

6. The container according to claim 2, wherein the cap includes a lip protruding outwardly from the rim.

7. The container according to claim 3, wherein the cap includes at least one guiding means to guide rotation of the cap within the hollow base and wherein the at least one guiding means is present on an outer surface of the rim of the cap, wherein the at least one guiding means is configured to travel in a corresponding groove provided on an inner surface of the side wall near the top end of the hollow base.

8. The container according to claim 7, wherein the at least one guiding means is selected from one of a lug, a pin and a protrusion; and wherein the groove is semi-circular in shape.

9. The container according to claim 8, wherein the at least one guiding means travel in the corresponding semicircular groove to allow the cap to rotate through 180 degree in one direction to open the container and through 180 degree in opposite direction to close the container.

10. The container according to claim 2, wherein the cap is provided with at least one locking means which prevents accidental movement of the cap from the closed position to the open position or vice versa.

11. The container according to claim 10, wherein the locking means includes at least one groove or a protrusion on an outer surface of the rim of the cap which engages with a corresponding protrusion or a groove provided on an inner surface of the side wall near the top end of the hollow base.

12. The container according to claim 1, wherein the support surface is a flat surface or a raised surface.

13. The container according to claim 1, wherein the plurality of apertures can be of any shape selected from circle, oval, square, rectangle and polygonal.

14. The container according to claim 1, wherein the support member comprising the support surface further comprises an outer skirt and an inner skirt, and wherein the outer skirt comprises a projection on its outer surface which engages with a corresponding annular groove present on an inner surface of the cap.

15. The container according to claim 14, wherein the support surface further comprises a central portion, and a plurality of mutually spaced elongated ribs radiating outwardly from the central portion to an inner surface of the inner skirt such that the plurality of apertures are formed between the mutually spaced elongated ribs.

16. The container according to claim 15, wherein the central portion is integrally connected to a gripping post.

17. A method for attaching a product to the support member of claim 1, wherein the method comprises of following steps:
   a) placing the support member on an open end of a desired shaped mold;
   b) filling the desired shaped mold by pouring a hot liquid product through the plurality of apertures in the support surface of the support member;
   c) cooling the desired shaped mold by passing it through a cooling chamber so that the liquid product solidifies into a solid product and gets attached to the support surface of the support member; and
   d) pulling out the support member carrying the solid product from the desired shaped mold.

18. A container for packaging and dispensing of a solid cosmetic or care product, the container comprising:
   a hollow base having a longitudinal axis; the hollow base comprises at least one side wall, an open top end and a bottom end;
   a cap mounted on the hollow base, the cap is rotatably mounted inside the hollow base about an axis making a non-zero angle to the longitudinal axis of the hollow base;
   wherein the cap comprises a support member which secures a solid product to the cap;
   wherein when the cap is rotated in a first direction to bring the container to a closed position, the solid product is enclosed within the hollow base;
   wherein when the cap is rotated in a second direction opposite to the first direction to bring the container to an open position, the solid product faces away from the hollow base;
   wherein the cap includes at least one guiding means to guide the rotation of the cap within the hollow base;
   wherein the at least one guiding means is present on an outer surface of the cap; and
   wherein the at least one guiding means is configured to travel in a corresponding semi-circular groove provided on an inner surface of a side wall of the hollow base, near a top end of the hollow base.

19. A container for packaging and dispensing of a solid cosmetic or care product, the container comprising:
   a hollow base having a longitudinal axis;
   a cap mounted on the hollow base, the cap is rotatably mounted inside the hollow base about an axis making a non-zero angle to the longitudinal axis of the hollow base;
   wherein the cap comprises a support member which secures a solid product to the cap;
   wherein when the cap is rotated in a first direction to bring the container to a closed position, the solid product is enclosed within the hollow base; and
   wherein when the cap is rotated in a second direction opposite to the first direction to bring the container to an open position, the solid product faces away from the hollow base.

* * * * *